United States Patent
Goncalves et al.

(10) Patent No.: US 12,506,780 B2
(45) Date of Patent: Dec. 23, 2025

(54) USING DECOY DATASETS FOR CYBER THREAT DETECTION

(71) Applicant: Dell Products L.P., Hopkinton, MA (US)

(72) Inventors: David Goncalves, Acushnet, MA (US); Evan Jones, Glenville, NY (US); Paul Linstead, Shrewsbury, MA (US)

(73) Assignee: Dell Products L.P., Hopkinton, MA (US)

( * ) Notice: Subject to any disclaimer, the term of this patent is extended or adjusted under 35 U.S.C. 154(b) by 176 days.

(21) Appl. No.: 18/366,802

(22) Filed: Aug. 8, 2023

(65) Prior Publication Data

US 2025/0055880 A1    Feb. 13, 2025

(51) Int. Cl.
*H04L 9/40* (2022.01)
*G06F 16/27* (2019.01)

(52) U.S. Cl.
CPC .......... *H04L 63/1491* (2013.01); *G06F 16/27* (2019.01); *H04L 63/1416* (2013.01); *G06F 2201/84* (2013.01)

(58) Field of Classification Search
CPC . H04L 63/1491; H04L 63/1416; G06F 16/27; G06F 2201/84
See application file for complete search history.

(56) References Cited

U.S. PATENT DOCUMENTS

| | | | |
|---|---|---|---|
| 11,960,606 B2* | 4/2024 | Orevi | G06F 21/568 |
| 2019/0205507 A1* | 7/2019 | Antonatos | H04L 63/1416 |
| 2020/0082076 A1* | 3/2020 | Rinaldi | G06F 21/566 |
| 2021/0383010 A1* | 12/2021 | Massiglia | G06F 11/2092 |
| 2022/0027471 A1* | 1/2022 | Levy | G06F 21/565 |
| 2022/0050898 A1* | 2/2022 | Rokade | G06F 11/1469 |
| 2023/0239323 A1* | 7/2023 | Seletskiy | H04L 63/1491 726/23 |

* cited by examiner

*Primary Examiner* — Thomas A Gyorfi
(74) *Attorney, Agent, or Firm* — Anderson Gorecki LLP (57) ABSTRACT

A storage node maintains storage objects that contain decoy datasets that are used to detect cyber-attacks. The decoy datasets may be deployed at logical block addresses (LBAs) including the first and last LBAs of the LBA range of the storage object. Real active data may be stored on the storage object with the decoy datasets. A cyber-attack is detected based on receipt of a suspicious IO command that accesses decoy data. Access to the decoy data may be detected by maintaining an IO access bitmap, calculating digital signatures of decoy datasets, or monitoring for decoy data that is marked for remote replication.

20 Claims, 5 Drawing Sheets

USING DECOY DATASETS FOR CYBER THREAT DETECTION

TECHNICAL FIELD

The subject matter of this disclosure is generally related to computing and data storage equipment.

BACKGROUND

Datacenters sometimes include clusters of servers and data storage nodes that are interconnected via switches. The servers run instances of host applications that support organizational processes such as email, accounting, inventory control, e-business, and engineering. Host application data is maintained by the storage nodes. Input-output (IO) commands are sent from the host servers to the storage nodes to enable the host application instances to read and write the host application data.

Cyber-attacks on datacenters are a growing problem. A ransomware attack, for example, can render data inaccessible to support the attacker's demand for payment of a ransom in exchange for restoration of data accessibility. Ransomware can render data inaccessible by encrypting the data and by locking storage objects on which the data is stored. Within a data center, ransomware may initially infect only a single host server. However, the infection can spread from the host server to the storage arrays, so large data sets and multiple host application instances and host servers can be adversely affected by a ransomware attack via a single host server. Existing techniques for detecting cyber-attacks that are in progress typically do not detect attacks until at least some data has been compromised.

SUMMARY

A method in accordance with some implementations comprises deploying at least one decoy dataset on at least one storage object maintained by a storage node; detecting a cyber-attack based on receipt of an input-output (IO) command to access a logical block address at which decoy data of the decoy dataset is stored on the storage object; and automatically performing at least one action to protect real data in response to detection of the cyber-attack.

In accordance with some implementations, a non-transitory computer-readable storage medium stores instructions that are executed by a computer to perform a method comprising deploying at least one decoy dataset on at least one storage object maintained by a storage node; detecting a cyber-attack based on receipt of an input-output (IO) command to access a logical block address at which decoy data of the decoy dataset is stored on the storage object; and automatically performing at least one action to protect real data in response to detection of the cyber-attack.

An apparatus in accordance with some implementations comprises a storage node comprising non-volatile storage and at least one compute node with a processor and memory configured to deploy at least one decoy dataset on at least one storage object maintained on the non-volatile storage, detect a cyber-attack based on receipt of an input-output (IO) command to access a logical block address at which decoy data of the decoy dataset is stored on the storage object, and automatically perform at least one action to protect real data in response to detection of the cyber-attack.

The summary does not limit the scope of the claims or the disclosure. All examples, embodiments, aspects, implementations, and features can be combined in any technically possible way and the method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array as the storage node. Such implementations are not limiting. For example, a wide variety of storage nodes might be implemented with the inventive concepts. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
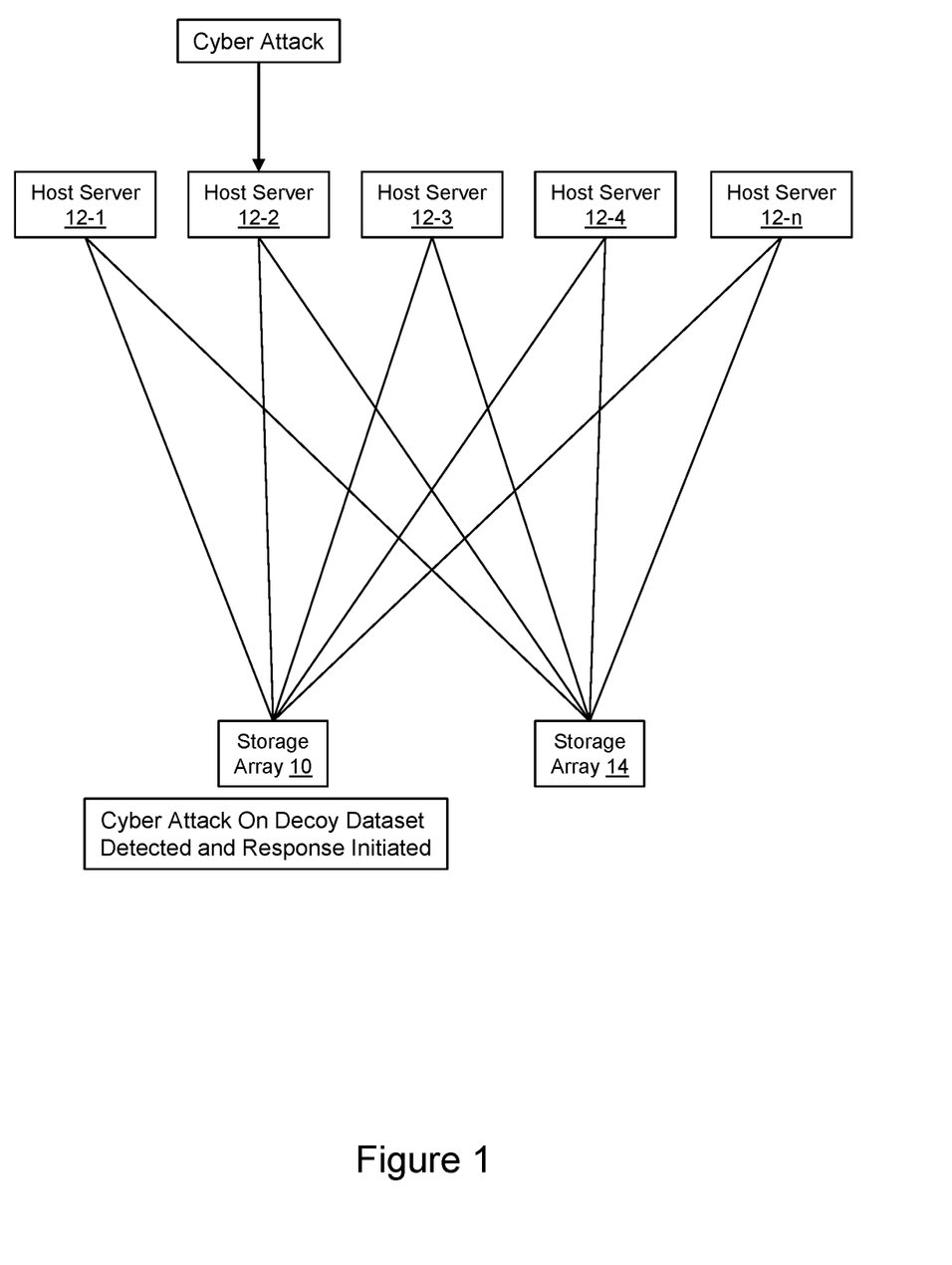
FIG. 1 illustrates a datacenter in which decoy datasets are used to detect cyber-attacks.

FIG. 1 illustrates a data center in which decoy datasets are used to detect cyber-attacks. The data center includes multiple storage arrays 10, 14 and host servers 12-1, 12-2, 12-3, and 12-4 through 12-*n*. The cyber-attack begins with the infection of host server 12-2. For example, the operating system of host server 12-2 may become infected by ransomware through communication with a compromised client computer. That infection is spread to storage array 10 from host server 12-2. For example, host server 12-2 may start sending IO commands to encrypt data on storage objects maintained by the storage array. At least some of those storage objects have decoy datasets stored thereon. Decoy data may be similar to the data that is used by the host application instances but the decoy data is not in current active use by the host application instances so decoy data isn't accessed unless there is a cyber-attack or error. Storage array 10 maintains a record of where the decoy datasets are stored on the storage objects. The storage array detects the cyber-attack based on IO commands that access data in the decoy datasets. An IO that reads decoy data or writes to an address range associated with a decoy dataset is inherently suspicious because the decoy data is not in active use by instances of the host applications. The clear delineation between decoy data and real data enables suspicious IO commands from an infected host server to be more quickly and accurately distinguished from legitimate IO commands relative to existing techniques such as monitoring for unusual IO patterns. In some instances a cyber-attack may be detected before any real data has been accessed.

Figure 2:
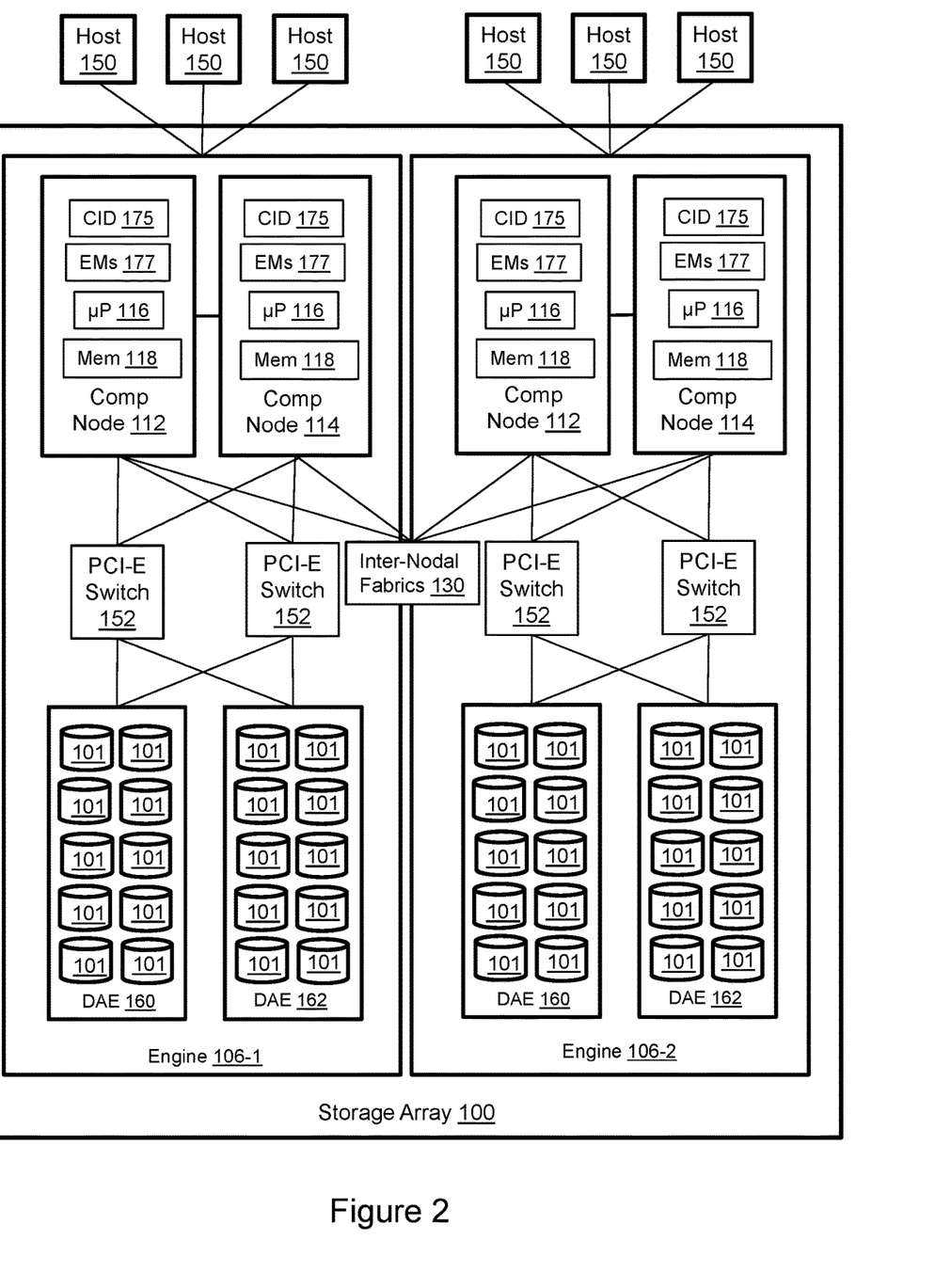
FIG. 2 illustrates a storage array in greater detail.

FIG. 2 illustrates an example of a storage array in greater detail. Storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. The processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130. Each compute node 112, 114 runs emulations (EMs 177) for completing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. Cyber intrusion detection is implemented by instances of cyber intrusion detection (CID) modules 175 of each compute node. The CID modules 175 may include one or more of special purpose electronic components, logic, and computer program code loaded into the memory 118 from the managed drives 101 and run on the processors 116. The CID modules coordinate with the emulations to detect and respond to cyber-attacks.

Figure 3:
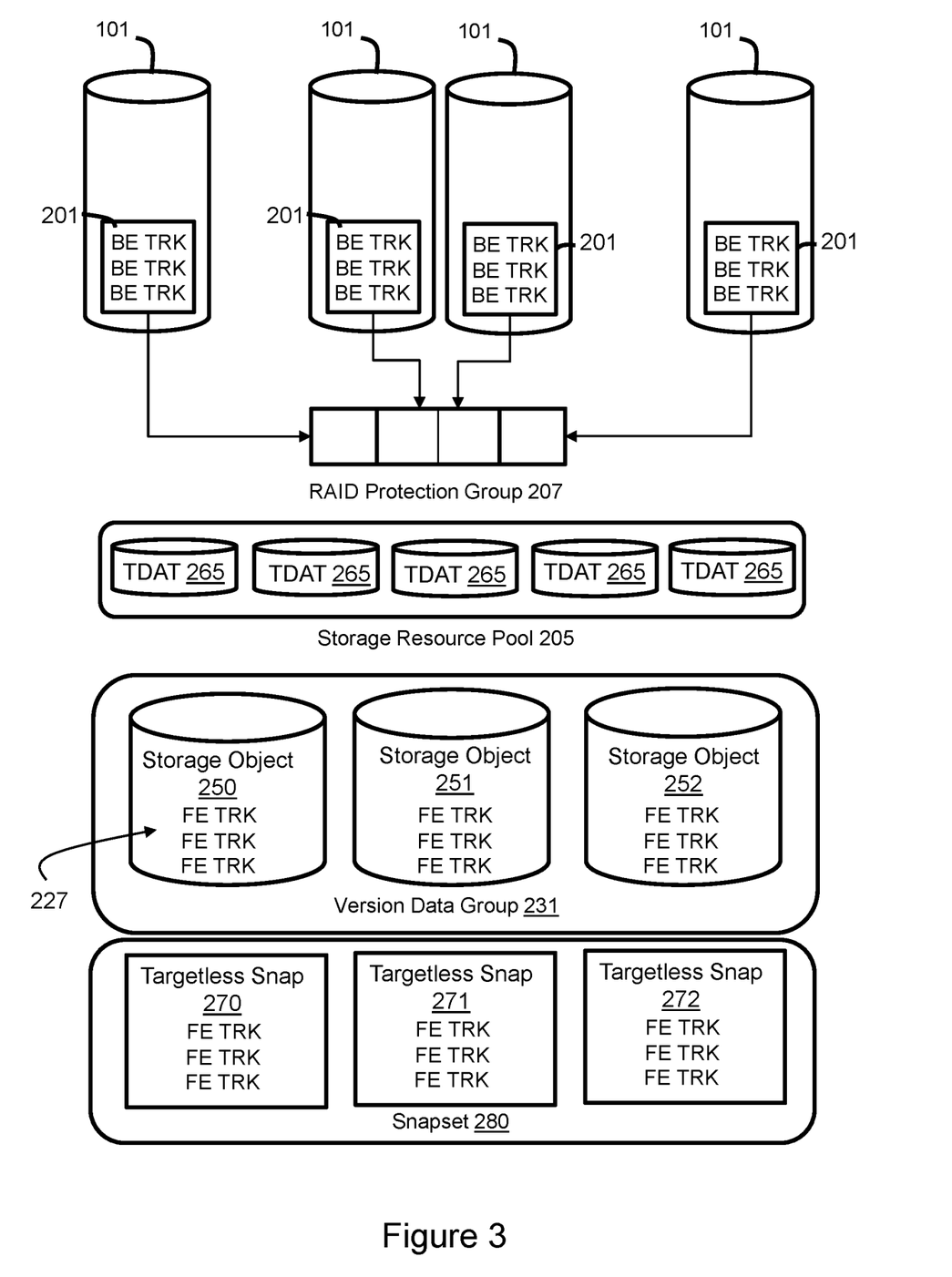
FIG. 3 illustrates how host application data is organized relative to the managed drives.

Referring to FIGS. 2 and 3, data that is created and used by instances of the host applications running on the host servers 150 is maintained on the managed drives 101. The managed drives are not discoverable by the host servers, so the storage array creates logical production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101.

IO services emulations running on the processors of the compute nodes maintain metadata that maps between the LBAs of the production storage objects 250, 251, 252 and physical addresses on the managed drives 101 in order to process IOs from the host servers. The basic allocation unit of storage capacity that is used by the compute nodes 112, 114 to access the managed drives is a back-end track (BE TRK). The managed drives are organized into same-size splits 201, each of which may contain multiple BE TRKs. Although individual drives can be configured as RAID group members, in the illustrated example a grouping of splits 201 from different managed drives is used to create a RAID protection group 207 with each split containing a protection group member. Specifically, splits from drives 101 are used to create RAID protection groups, such as RAID-5 or RAID-6. A storage resource pool 205 is a type of storage object that includes a collection of protection groups of the same RAID level on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A host application image contains all the production storage objects associated with an individual host application.

Data protection is implemented locally relative to the storage array by generating targetless snapshots of storage objects. Each targetless snapshot represents the state of a storage object at a prior point in time and thus provides a recovery point for that storage object. A corrupted, maliciously locked, or maliciously encrypted storage object can be restored to an uncorrupted, unlocked, or unencrypted recovery point represented by an existing targetless snapshot, i.e., a targetless snapshot created before the corresponding storage object was affected by the ransomware attack. A snapset 280 of targetless snapshots 270, 271, 272 includes targetless snapshots of each storage object in a version data group 231. In the illustrated example, version data group 231 includes storage objects 250, 251, 252 and targetless snapshot 270 is a snapshot of storage object 250, targetless snapshot 271 is a snapshot of storage object 251, and targetless snapshot 272 is a snapshot of storage object 252. All targetless snapshots in a snapset instance have the same recovery point. The storage objects of the version data group may all be associated with the same host application image, so maliciously encrypted data of a particular host application can be restored to a common recovery point using a corresponding snapset.

Data protection is implemented remotely by remote data services emulations. A local replica, e.g., storage object 250, is synchronized with a remote replica by marking updated tracks of the local replica as invalid until the changes are written to the remote replica. More specifically, sets of changes are accumulated over a relatively short interval of time and periodically sent to a remote storage array, which acknowledges replication of the changes to the remote replica of the storage object 250. If protected from a cyber-attack, the remote replica can be used to recover storage object 250 in the event that storage object 250 is compromised by the cyber-attack.

Figure 4:
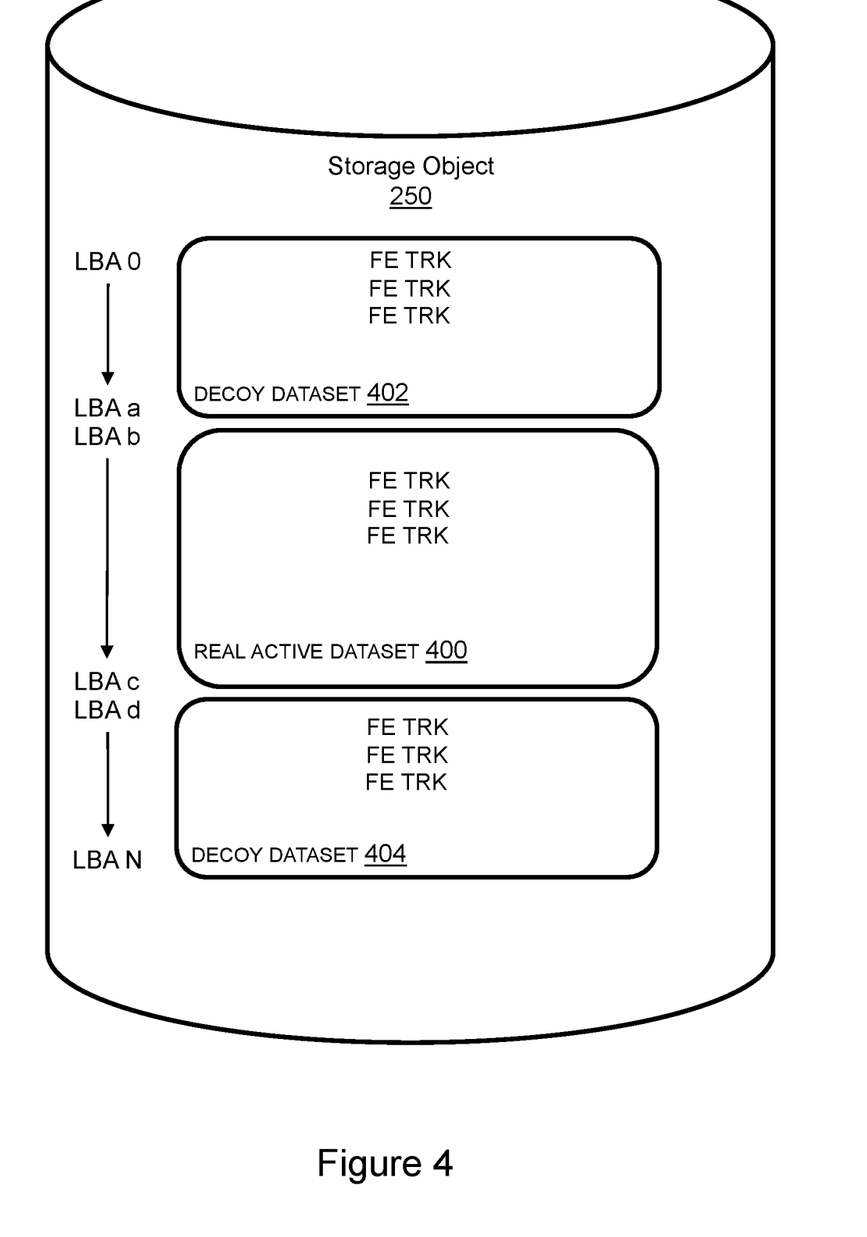
FIG. 4 illustrates deployment of decoy datasets in greater detail.

FIG. 4 illustrates deployment of decoy datasets in greater detail. The decoy data may be randomly generated or, as previously mentioned, be similar to real active data of a real active dataset 400. For example, the decoy data may be generated by a machine learning model trained on real data or include stale real data, such as aged-out snapshot data. The decoy data may be selected to be highly compressible so that it can be efficiently stored on a relatively small amount of space on the managed drives. In some embodiments there are storage objects that contain only decoy data and do not contain any real active data. In some embodiments the decoy datasets are integrated into the same storage objects as real active data. In the illustrated example, decoy dataset 402 and decoy dataset 404 are both stored with a real active dataset 400 on storage object 250. More specifically, the decoy datasets are located at the extremes of the LBA range of the storage object. Storage object 250 has a range of LBAs from 0 to N. Decoy dataset 402 includes a range of LBAs from LBA 0 to LBA a. Decoy dataset 404 includes a range of LBAs from LBA d to LBA N. Real active dataset 400 is at a range from LBA b to LBA c, which is between decoy dataset 402 and decoy dataset 404. IO access associated with cyber-attacks often begin with the first or last LBA of a storage object. Consequently, locating decoy datasets at the beginning and/or end of the LBA range of the storage object increases the likelihood of detecting a malicious attack before the real active dataset is accessed.

Figure 5:
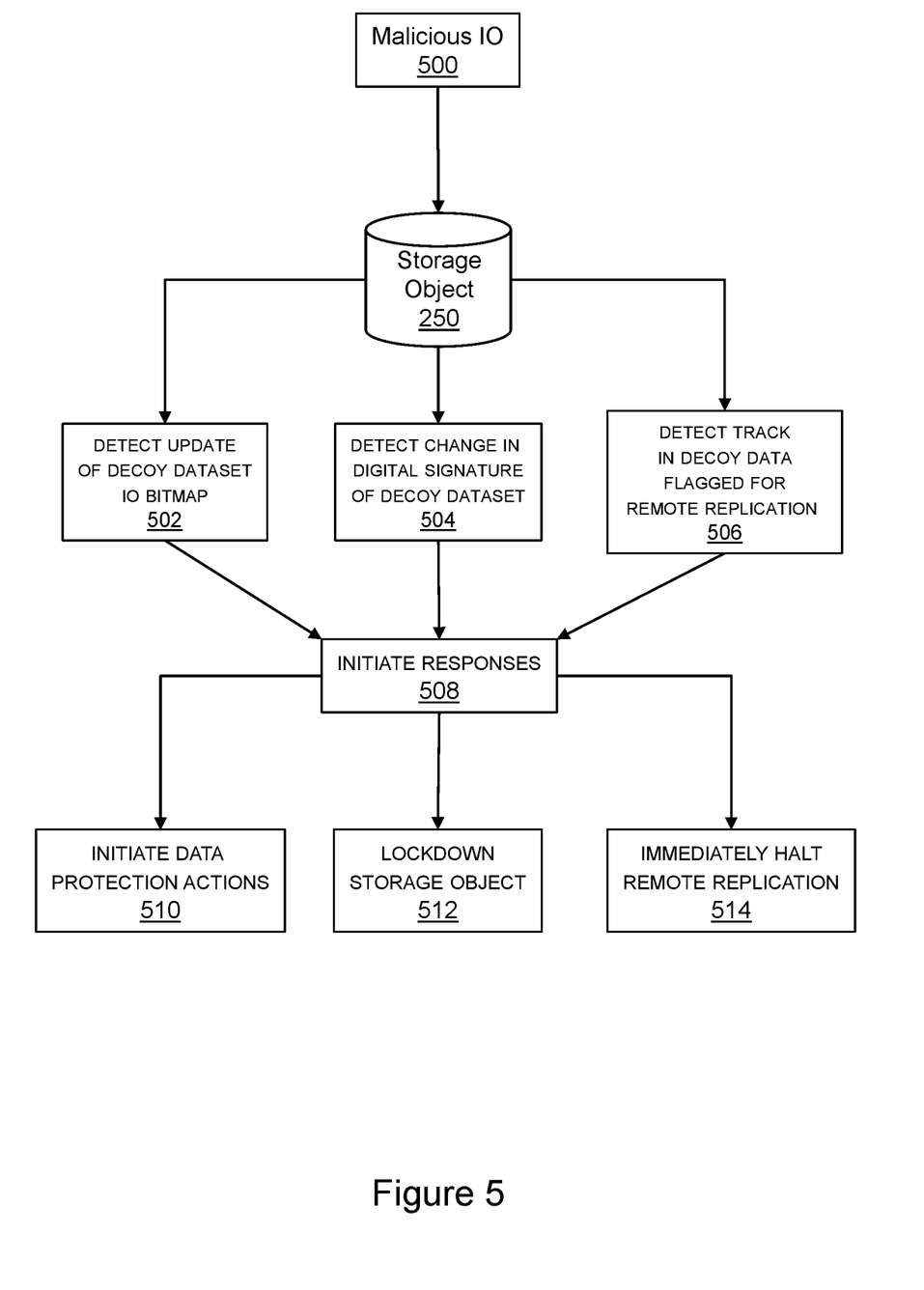
FIG. 5 illustrates a method for using decoy datasets to detect and respond to cyber-attacks.

FIG. 5 illustrates a method for using decoy datasets to detect and respond to cyber-attacks. The steps are not necessarily performed in the illustrated order and some steps may be omitted in different embodiments. The attack begins with a malicious IO 500 associated with a cyber-attack being sent from a host server to access storage object 250. Malicious IO 500 can be detected in any of multiple ways. For example, a bitmap of write IO access, read IO access, or both to storage object 250 may be maintained and used to detect suspicious IO activity as indicated in step 502. The bitmap includes an entry (bit) for each LBA of the storage object. A bit is set when an attempt is made to access the corresponding LBA. In the case of IOs to the LBA range of decoy data, the IO services emulation may reject the IOs but set the bits of the LBAs for which access was attempted. Monitoring the bits of the bitmap associated with the decoy datasets enables detection of malicious IOs because the LBAs within the range of the decoy datasets are unlikely to be accessed any IOs other than malicious IOs. Alternatively or additionally, malicious IOs may be detected based on changes of a digital signature such as a cyclic redundancy check (CRC) of a decoy dataset as indicated in step 504. The digital signature may include only the decoy data or a combination of decoy data and associated metadata. If only the decoy data is included in the calculation of the digital signature, then the data must change in order to detect malicious access so only malicious write IOs are detected. However, if the decoy data and metadata are included in the calculation of the digital signature, then it may be possible to detect malicious read or write IOs. Alternatively or additionally, malicious IOs may be detected based on remote replication activity as indicated in step 506. When a track of a local replica is changed by an IO, the track is marked as invalid, thereby flagging the track for remote replication. The existence of a track of decoy data being marked as invalid is inherently suspicious because the decoy data is not in use by the host application instances.

Detection of a malicious IO by any one of steps 502, 504, 506 prompts initiation of a response as indicated in step 508. The response may include one or more of several possible steps. Step 510 is initiating data protection actions. This step may include priority generation of a new targetless snapshot of the attacked storage object or creation of a snapset of all storage objects in a version data group targeted by the detected attack. Step 510 may include securing targetless snapshots that satisfy predetermined criteria. For example, and without limitation, targetless snapshots of the most recently created snapset of the storage objects in the version data group targeted by the detected attack may be secured. Securing targetless snapshots prevents the secured targetless snapshots from being automatically discarded to free resources to accommodate new write IOs when memory or storage resources are fully utilized. Step 510 may include preserving targetless snapshots that satisfy predetermined criteria. For example, and without limitation, targetless snapshots of the snapsets of the storage objects in the version data group targeted by the detected attack may be preserved. Preserving targetless snapshots prevents the preserved targetless snapshots from being automatically discarded according to the snapshot retention schedule. Step 510 may include modifying the targetless snapshot generation and retention schedule. For example, the frequency of generation of new targetless snapshots may be increased to create more recovery points or decreased to avoid using resources to protect data that has already been affected by the ransomware attack. In some embodiments the generation of new targetless snapshots is temporarily halted. In step 512, the storage object targeted by the cyber-attack is locked-down, e.g., placed in a not ready state. IO commands directed to a locked-down storage object are refused by the storage array, so no further changes to the storage object can be made by malicious IOs pursuant to the cyber-attack. Step 514 is immediately halting remote replication of the storage object. Halting remote replication of the storage object protects the remote replica from replicating malicious updates to the local replica. After the source of the cyber-attack has been identified and contained, the storage object is unlocked and the targetless snapshot generated in step 510, the remote replica, or both, are used to restore the storage object, if necessary. The IO bitmaps may be reset, and digital signatures recalculated.

The inventive concepts disclosed herein are not limited by any particular advantages but at least some embodiments increase the likelihood of detection of a cyber-attack before real active data is compromised. Malicious access to decoy data is not particularly harmful and facilitates quicker and more accurate detection of a cyber-attack than at least some known techniques.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. A method comprising:
in a storage array with processors, volatile memory and managed disk drives that are not discoverable by host servers, deploying at least one decoy dataset together with real active data on at least one storage object of a plurality of storage objects maintained by a storage node on the managed disk drives, the storage object being accessed by the host servers as a single disk drive and being uniquely associated with a single host application running on the host servers and discoverable by the host servers;
detecting a remote cyber-attack originating from an instance of the single host application running on a compromised one of the servers based on receipt of an input-output (IO) command from that instance of the host application to access a logical block address at which decoy data of the decoy dataset is stored on the storage object; and
automatically performing at least one action to protect real data in response to detection of the cyber-attack.

2. The method of claim 1 further comprising deploying a first decoy dataset at a first range of logical block addresses starting at a first logical block address of the storage object and storing a real active dataset at a second range of logical block addresses adjacent to the first range of logical block addresses.

3. The method of claim 2 further comprising deploying a third decoy dataset at a third range of logical block addresses that includes a last logical block address of the storage object and is adjacent to the second range of logical block addresses.

4. The method of claim 1 further comprising maintaining an IO access bitmap of the storage object and detecting the cyber-attack based on receipt of an IO command that sets a bit associated with a logical block address at which decoy data is stored on the storage object.

5. The method of claim 1 further comprising calculating a digital signature of the decoy dataset and detecting the cyber-attack based on receipt of an IO command that changes the digital signature of the decoy dataset.

6. The method of claim 1 further comprising remotely replicating the storage object and detecting the cyber-attack based on receipt of an IO command that prompts replication of decoy data.

7. The method of claim 1 further comprising automatically performing at least one action to protect real data in response to detection of the cyber-attack selected from the group comprising:
creating a new targetless snapshot of the storage object;
locking-down the storage object; and
halting remote replication of the storage object.

8. A non-transitory computer-readable storage medium storing instructions that are executed by a computer to perform a method comprising:
in a storage array with processors, volatile memory and managed disk drives that are not discoverable by host servers, deploying at least one decoy dataset together with real active data on at least one storage object of a plurality of storage objects maintained by a storage node on the managed disk drives, the storage object being accessed by the host servers as a single disk drive and being uniquely associated with a single host application running on the host servers and discoverable by the host servers;
detecting a remote cyber-attack originating from an instance of the single host application running on a compromised one of the servers based on receipt of an input-output (IO) command from that instance of the host application to access a logical block address at which decoy data of the decoy dataset is stored on the storage object; and
automatically performing at least one action to protect real data in response to detection of the cyber-attack.

9. The non-transitory computer-readable storage medium of claim 8 further comprising deploying a first decoy dataset at a first range of logical block addresses starting at a first logical block address of the storage object and storing a real active dataset at a second range of logical block addresses adjacent to the first range of logical block addresses.

10. The non-transitory computer-readable storage medium of claim 9 further comprising deploying a third decoy dataset at a third range of logical block addresses that includes a last logical block address of the storage object and is adjacent to the second range of logical block addresses.

11. The non-transitory computer-readable storage medium of claim 8 further comprising maintaining an IO access bitmap of the storage object and detecting the cyber-attack based on receipt of an IO command that sets a bit associated with a logical block address at which decoy data is stored on the storage object.

12. The non-transitory computer-readable storage medium of claim 8 further comprising calculating a digital signature of the decoy dataset and detecting the cyber-attack based on receipt of an IO command that changes the digital signature of the decoy dataset.

13. The non-transitory computer-readable storage medium of claim 8 further comprising remotely replicating the storage object and detecting the cyber-attack based on receipt of an IO command that prompts replication of decoy data.

14. The non-transitory computer-readable storage medium of claim 8 further comprising automatically performing at least one action to protect real data in response to detection of the cyber-attack selected from the group comprising:
creating a new targetless snapshot of the storage object;
locking-down the storage object; and
halting remote replication of the storage object.

15. An apparatus comprising:
a storage node comprising non-volatile storage and at least one compute node with a processor and memory drives that are not discoverable by host servers, the storage node configured to deploy at least one decoy dataset together with real active data on at least one storage object of a plurality of storage objects maintained on the non-volatile storage, the storage object being accessed by the host servers as a single disk drive and being uniquely associated with a single host application running on the host servers and discoverable by the host servers, detect a remote cyber-attack originating from an instance of the single host application running on a compromised one of the servers based on receipt of an input-output (IO) command from that instance of the host application to access a logical block address at which decoy data of the decoy dataset is stored on the storage object, and automatically perform at least one action to protect real data in response to detection of the cyber-attack.

16. The apparatus of claim 15 further comprising a first decoy dataset deployed at a first range of logical block addresses starting at a first logical block address of the storage object and a real active dataset stored at a second range of logical block addresses adjacent to the first range of logical block addresses.

17. The apparatus of claim 16 further comprising a third decoy dataset deployed at a third range of logical block addresses that includes a last logical block address of the storage object and is adjacent to the second range of logical block addresses.

18. The apparatus of claim 15 further comprising an IO access bitmap of the storage object used to detect the cyber-attack based on receipt of an IO command that sets a bit associated with a logical block address at which decoy data is stored on the storage object.

19. The apparatus of claim 15 further comprising the compute node configured to calculate a digital signature of the decoy dataset and detect the cyber-attack based on receipt of an IO command that changes the digital signature of the decoy dataset.

20. The apparatus of claim 15 further comprising the storage object being remotely replicated and the compute node configured to detect the cyber-attack based on receipt of an IO command that prompts replication of decoy data.

\* \* \* \* \*